Feb. 27, 1951     E. R. GAERTTNER     2,543,454
RADIO RESPONDER BEACON SYSTEM
Filed April 3, 1945
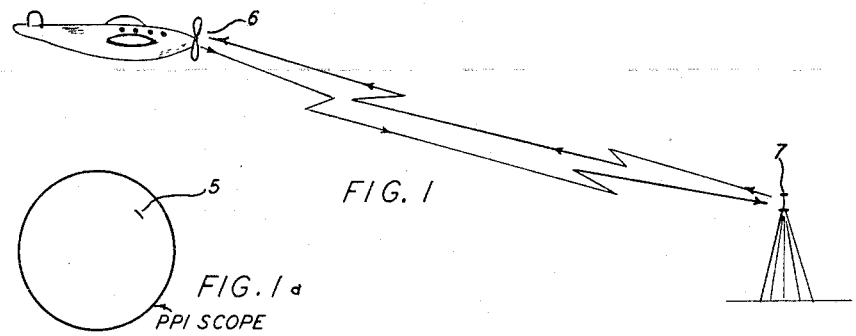
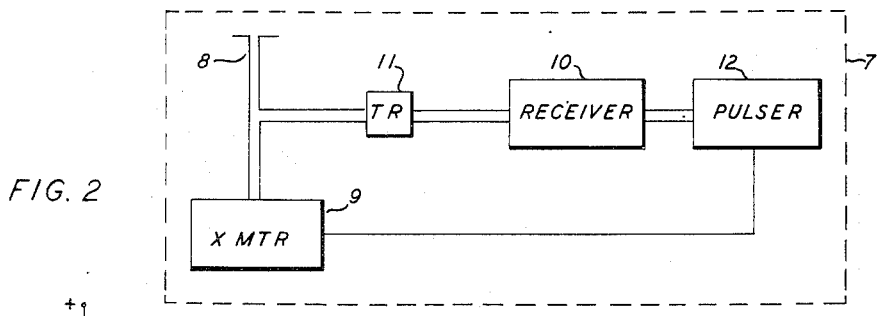
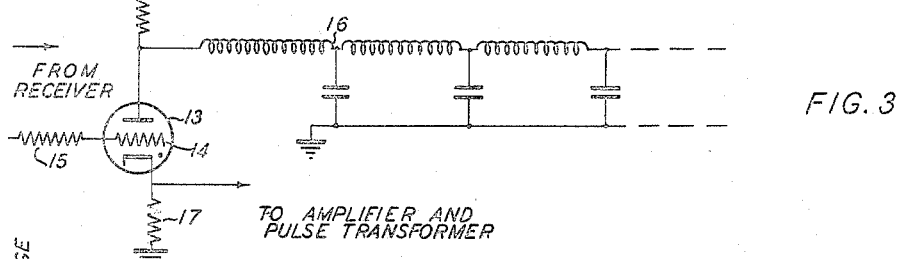
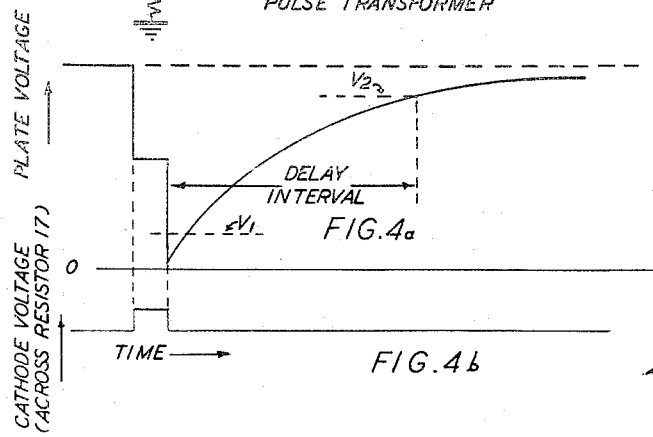
INVENTOR.
ERWIN R. GAERTTNER
BY
William D. Hall,
ATTORNEY Patented Feb. 27, 1951

2,543,454

UNITED STATES PATENT OFFICE 2,543,454

RADIO RESPONDER BEACON SYSTEM

Erwin R. Gaerttner, Belmont, Mass., assignor, by mesne assignments, to the United States of America as represented by the Secretary of War Application April 3, 1945, Serial No. 586,421

4 Claims. (Cl. 250—15)

1

This invention relates to a radio system and particularly to a radio navigation system utilizing a responder type beacon.

In the past, radio aids to navigation have consisted generally of two basic systems. One is the direction finding system utilizing a directional loop antenna by means of which bearings are taken on two or more radio transmitting stations, the locations of which are known. By triangulation the position of the navigator may be determined with respect to these known radio stations. A modification of this method involves taking a bearing on one station and flying to that station, a procedure known as "homing."

Another widely used system contemplates a number of radio beacon transmitters located throughout an area, each transmitter covering a predetermined sector of the area with a coded signal. Due to overlapping of the sectors, navigation is possible by a comparison of the coded signals from any two transmitters.

The first method is time-consuming in operation, and is inaccurate at times in that it is subject to "night-effect" errors giving false direction indications. The second system entailing the use of beacon transmitters requires elaborate equipment and establishment of fixed highways of the air used principally by the commercial airlines. For those planes which do not desire to follow the fixed highway, the beacons are of little or no aid.

Among objects of this invention are:

To provide a radio navigation system operating on new and improved principles which obviate the disadvantages mentioned above;

To provide a radio navigation system comprising a beacon the location of which may be known but which will not be continuously operating;

To provide a radio beacon which will operate only when desired in response to an interrogating signal;

To provide a beacon which will respond to the interrogating signal only, and not to reflections of this signal.

Other objects will be apparent to those skilled in the art after a study of the following specification and claims taken in connection with the accompanying drawings in which:

Fig. 1 shows diagrammatically an aircraft and the responder beacon in use.

Fig. 1a illustrates the indication on the cathode ray tube as seen by the navigator.

Fig. 2 is a schematic diagram in block form showing the elements of the beacon.

Fig. 3 is a detailed schematic diagram of the pulser portion of the beacon.

2

Fig. 4a is a curve showing the idealized plate voltage of tube 13 of Fig. 3 as plotted against time.

Fig. 4b is a curve showing the idealized output voltage of the pulser of Fig. 3 as plotted against the same time axis as that of Fig. 4a.

Referring now in more detail to Fig. 1 there is shown an aircraft 6 in which a pilot or navigator desires to find the location of the plane with respect to an airport to which it is flying. A beacon 7 of the type described in this invention may be located at or near the airport.

The plane 6 may be equipped with radio direction and range determining apparatus, the principles of which are well known in the art. This radio equipment utilizes the cathode ray tube type presentation known as plan position indication in which the scan of the cathode ray tube radiates from the center of the tube toward the perimeter while at the same time rotating about the center.

A pulse may be transmitted by the radio equipment which will be received by beacon 7. The transmitter of beacon 7 is normally in a non-transmitting condition. Upon the receipt of a signal by the receiver of the beacon the transmitter is triggered so as to radiate a pulse which will return to and be picked up by the radio equipment on the plane.

The return pulse will be indicated on the cathode ray tube of the plane as shown in Fig. 1a. In such a presentation the direction of return of the pulse with respect to the plane and the distance from the plane to the beacon will be indicated in one view. The center of the tube may represent the position of the plane with the top of the tube representing direction dead ahead. An indication 5 consisting of an illuminated spot appearing on the face of the cathode ray tube gives the azimuth of the direction of the return of the pulse, and the radial distance from the center of the tube to the indication 5 indicates the range from the plane to the point of origin of the return pulse. Thus the operator may see at a glance the position of the plane with respect to the known position of the beacon.

In Fig. 2 there is shown in block diagram form the component parts of the beacon. Insofar as the general arrangement is concerned it may be seen to comprise the usual components of a radio object-locating system, namely: a pulse transmitter 9, receiver 10, antenna 8, and transmit-receive box 11. In addition there is a circuit which may be identified as a pulser circuit 12 connected in the output of receiver 10. The output of pulser 12 is connected in return to transmitter 9 and its operation will hereinafter be explained.

Receiver 10 is tuned to the exact frequency of the transmitter on the plane and the receiver on the plane is tuned to the exact frequency of the transmitter beacon; in the usual object-locating system these will be of the same frequency. A pulse signal transmitted from plane 6 and picked up by antenna 8 is amplified by receiver 10 after passing through transmit-receive box 11, and is then fed to pulser circuit 12 so as to initiate a short voltage pulse. This short output pulse from circuit 12 is then utilized to trigger the transmitter 9, causing it to radiate a short pulse of energy. The pulse radiated from transmitter 9 will be picked up by the plane 6 and indication 5 will appear on the PPI scope just as it would appear had the transmitted pulse from the plane been reflected from a distant object and returned, except that it will be of greater intensity.

It is well known that the radiated pulse from the plane will be reflected and dispersed from numerous objects on or near the ground. One or more of these spurious reflections will normally be picked up by antenna 8 of beacon 7. These reflected pulses would trigger the beacon just as the main pulse emitted from the plane and would cause it to transmit additional signals.

The effect of such spurious signals is eliminated in this invention by using a simple pulse circuit, a preferred embodiment of which is illustrated in Fig. 3. This circuit comprises an electron tube 13 of the gas-filled type. The output of receiver 10 is fed to the grid 14 of tube 13 through a resistor 15. In the anode circuit of tube 13 is a pulse-forming line 16. Pulse-forming line 16 simulates a continuous transmission line open-circuited at its far end. Actually, line 16 may be designed to contain a plurality of lumped circuit elements, as is well known in transmission line theory.

The output voltage from pulser 12 is taken from across resistor 17 in the cathode circuit of tube 13. This output voltage appearing across resistor 17 is of pulse form, and may be amplified and used to trigger the transmitter 9. Plate voltage is supplied to tube 13 through a resistor 18.

Upon application of an initial pulse to grid 14, tube 13 will fire, that is, it will start conducting, and a sharp voltage drop at the plate of tube 13 results. This sudden voltage drop across the transmission line 16 travels along the line toward the open-circuited end and is reflected back without change of polarity, returning to its point of origin, the plate of tube 13. As a result of the reflection, another sharp drop in voltage occurs at the plate of tube 13 approximately equal in magnitude to the original drop in voltage, but somewhat less than the first drop due to attenuation. The time from the first to the second voltage drop is the time required for the pulse to travel line 16 and return and will depend, of course, on the electrical constants of line 16. The circuit is so designed that after the first sharp voltage drop, and before the second, tube 13 is conductive, grid 14 having lost its ability to control the current flow in tube 13 in response to signals of the magnitude impressed on it. However, upon return of the reflected voltage impulse to the plate of tube 13, the plate voltage is reduced to a point below the de-ionization potential of tube 13. When this second decrease in plate voltage occurs, therefore, tube 13 can no longer conduct, and it will remain non-conductive until its plate voltage reaches a value such that the tube will again fire upon receipt of an input pulse, that is, when grid 14 again controls the current flow in tube 13. After the second drop in plate potential, the plate voltage will rise exponentially as determined mainly by the value of resistor 18 and the capacity of line 16. Voltage at the plate of tube 13 is illustrated in idealized form in Fig. 4a, in which $V_1$ represents the de-ionization voltage, and $V_2$ the voltage at which grid 14 regains control of current flow in tube 13.

The output voltage across resistor 17 is illustrated in idealized form in Fig. 4b, and is dependent on the current passing through resistor 17 and tube 13. Since current will flow through the tube only during the time interval between the first and second abrupt drops in potential at the plate of tube 13, the output voltage across resistor 17 assumes the form shown in Fig. 4b, with a time duration equal to the time necessary for the transient voltage impulse to travel the length of transmission line 16 and return. This time duration may be of the order of 1 microsecond.

Resistor 18 may be made large enough so that a relatively long time interval, of the order of 150 microseconds, must elapse before gas tube 13 will again respond to incoming signals, as indicated in Fig. 4a. Consequently, having once been triggered by the radio pulse from the aircraft 6, beacon 7 will not respond again for 150 microseconds. This time is normally sufficient to prevent its being fired under the influence of spurious signals reflected from nearby objects or other planes in the vicinity. The delay gate also prevents "ring-around" or triggering of the beacon by its own transmitter.

Since the beacon pulses as received by the plane 6 are of considerable intensity, they are easily identified as being emitted by the beacon 7 and differentiated from mere reflected echoes.

While the invention has been disclosed herein as being applied to a fixed ground beacon, it may be adapted equally well to an airborne system such as may be employed to furnish a "mother" plane information as to the relative location of a radio controlled "drone." The beacon is located on the drone and is responsive to radio object-locating equipment on the mother plane. Operation of the beacon apparatus is the same as described hereinabove.

It will be apparent to those skilled in the art that many other modifications are possible without departing from the scope and spirit of the invention.

What is claimed is:

1. In a radio responder beacon having means for receiving radiant energy pulse signals and means responsive to said pulse signals for transmitting pulse response signals, said responsive means including a gaseous discharge tube having an anode, a cathode and a control grid, means for impressing said received signals on said control grid thereby initiating respective response signals, and circuit means for simultaneously rendering said tube inoperative for a predetermined length of time after the reception of each of said signals whereby said responsive means are made non-responsive for said predetermined length of time.

2. In a radio responder beacon as set forth in claim 1 wherein said circiut means comprises a pulse forming line connected to said anode.

3. A radio responder beacon comprising means for receiving an interrogating pulse of electromagnetic energy, transmitting means responsive to said pulse for transmitting a responding pulse of electromagnetic energy, and circuit means interconnected between said receiving means and said transmitting means and responsive to an interrogating pulse for rendering said beacon inoperative for a predetermined length of time after the reception of said pulse, whereby said beacon is maintained in a non-responsive condition to further interrogating pulses of electromagnetic energy during said predetermined length of time and thereafter returned to a responsive condition.

4. In a radio responder beacon having means for receiving a radiant energy pulse signal and means responsive to said pulse signal for transmitting a responding radiant energy pulse signal, said responsive means including a normally cut-off gaseous discharge tube having an anode, grid and cathode, a source of direct potential which is positive with respect to a point of reference potential, a first resistor connected intermediate said cathode and said point of reference potential, an output circuit connected across said first resistor, a second resistor connected intermediate said anode and said source of direct potential, means for impressing the modulation component of said received pulse on said grid thereby rendering said tube conductive, and an open ended delay line connected to said anode, said line having a given effective capacitance, the pulse impressed on said grid resulting in a sharp voltage impulse at said anode which travels down and back said delay line, said tube being cut off after the interval required for said impulse to travel to the open end of said line and return, and said tube remaining insensiitve to further received signals for an interval determined by the value of said second resistor and the capacitance of said delay line.

ERWIN R. GAERTTNER.

REFERENCES CITED

The following references are of record in the file of this patent:

UNITED STATES PATENTS

| Number | Name | Date |
|---|---|---|
| 1,945,952 | Nicolson | Feb. 6, 1934 |
| 2,134,716 | Gunn | Nov. 1, 1938 |
| 2,221,666 | Wilson | Nov. 12, 1940 |
| 2,252,599 | Lewis | Aug. 12, 1941 |
| 2,425,316 | Dow | Aug. 12, 1947 |
| 2,444,426 | Busignies | July 6, 1948 |